（12） United States Patent
Suenaga et al.

(10) Patent No.: US 12,126,220 B2
(45) Date of Patent: Oct. 22, 2024

(54) ROTOR, METHOD FOR DESIGNING ROTOR, AND METHOD FOR PRODUCING ROTOR

(71) Applicant: NIPPON STEEL CORPORATION, Tokyo (JP)

(72) Inventors: Shin Suenaga, Tokyo (JP); Yoshihiro Arita, Tokyo (JP); Yoshifumi Ohata, Tokyo (JP); Takashi Aramaki, Tokyo (JP); Shuji Yamamoto, Kitakyushu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 320 days.

(21) Appl. No.: 17/642,906

(22) PCT Filed: Oct. 6, 2020

(86) PCT No.: PCT/JP2020/037796
§ 371 (c)(1),
(2) Date: Mar. 14, 2022

(87) PCT Pub. No.: WO2021/070795
PCT Pub. Date: Apr. 15, 2021

(65) Prior Publication Data
US 2022/0368182 A1    Nov. 17, 2022

(30) Foreign Application Priority Data
Oct. 8, 2019  (JP) .................................. 2019-185110

(51) Int. Cl.
*H02K 1/276*    (2022.01)
*H02K 1/02*    (2006.01)
(Continued)

(52) U.S. Cl.
CPC ............... *H02K 1/276* (2013.01); *H02K 1/02* (2013.01); *H02K 15/03* (2013.01); *H02K 15/12* (2013.01);
(Continued)

(58) Field of Classification Search
CPC ........ H02K 1/276; H02K 15/03; H02K 21/14; H02K 7/006; H02K 1/27; Y19T 29/49009
(Continued)

(56) References Cited

U.S. PATENT DOCUMENTS 2,554,226 A * 5/1951 Taylor .................... H02K 1/185
310/431
7,777,387 B2 * 8/2010 Nagai .................. H02K 15/026
310/216.013
2021/0171813 A1  6/2021 Kaneko

FOREIGN PATENT DOCUMENTS

JP  2002-369422 A   12/2002
JP  2004-88970 A    3/2004
(Continued)

OTHER PUBLICATIONS

Decision to Grant dated Oct. 3, 2023 for corresponding Application No. 2021-551654 with an English translation.
(Continued)

*Primary Examiner* — Thiem D Phan
(74) *Attorney, Agent, or Firm* — Birch, Stewart, Kolasch & Birch, LLP

(57) ABSTRACT

A rotor is a magnet-embedded rotor incorporated in a traveling motor of a vehicle, and includes: a laminated core having steel sheets laminated to each other and a bonding layer for bonding the steel sheets adjacent to each other in a laminating direction; and a magnet embedded in the laminated core. When the rotor rotates at 11000 rpm, a maximum amount of displacement of an outer edge of the
(Continued)

laminated core of the rotor in a radial direction is 0.1 mm or less.

7 Claims, 5 Drawing Sheets

(51) Int. Cl.
  *H02K 15/03* (2006.01)
  *H02K 15/12* (2006.01)
(52) U.S. Cl.
  CPC ..... *H02K 2213/03* (2013.01); *Y10T 29/49009* (2015.01)
(58) Field of Classification Search
  USPC .................................. 29/596, 598, 607, 609
  See application file for complete search history.

(56) References Cited

FOREIGN PATENT DOCUMENTS

| JP | 2005-94940 A | 4/2005 |
|---|---|---|
| JP | 4311127 B2 | 8/2009 |
| JP | 2014-197981 A | 10/2014 |
| JP | 2014-220911 A | 11/2014 |
| JP | 2019-161928 A | 9/2019 |
| TW | 201444903 A | 12/2014 |
| WO | WO2012/102030 A1 | 8/2012 |
| WO | 2019/123885 A1 | 6/2019 |

OTHER PUBLICATIONS

Japanese Office Action dated Jan. 4, 2023 for corresponding Application No. 2021-551654 with an English translation.
Imamura, "Epoxy Resin, Plastic Data Book", Version 1, Japan, Kogyo Chosakai Publishing Co., Ltd., Dec. 1, 1999, pp. 260-262 (4 pages total), ISBN: 4-7693-4128-8.
Japanese Office Action dated Jun. 6, 2023 for corresponding Application No. 2021-551654 with an English translation.
Electrical Steel Sheets, Catalog, Nippon Steel & Sumitomo Metal, 2018, total of 2 pages.
Nippon Steel & Sumitomo Metal, "Electrical Steel Sheets", Flat Products, 2014, p. 21 (3 pages total), InternetURL:https://catalog.e-setsubi.net/iportal/CatalogDetail.do?method=catalogSearchByDefaultSettingCategories&volumeID-CATALABO&designID=HAT>, [date of search Dec. 2, 2022].
Nippon Steel & Sumitomo Metal, "Electrical Steel Sheets", Flat Products, 2018, pp. 1-33.

* cited by examiner

ROTOR, METHOD FOR DESIGNING ROTOR, AND METHOD FOR PRODUCING ROTOR

TECHNICAL FIELD

The present invention relates to a rotor, a method for designing a rotor, and a method for producing a rotor.

Priority is claimed on Japanese Patent Application No. 2019-185110, filed Oct. 8, 2019, the content of which is incorporated herein by reference.

BACKGROUND ART

Rotors are cores used as rotating bodies in motors. Rotors have so far been produced mainly using caulking structures. However, in recent years, for the purpose of reducing thicknesses of electrical steel sheets and improving production efficiency, production methods in which (1) a bonding structure and (2) a combination structure of caulking and bonding are utilized have been proposed (for example, refer to Patent Document 1).

CITATION LIST

Patent Document

Patent Document 1

Japanese Unexamined Patent Application, First Publication No. 2014-197981

SUMMARY OF THE INVENTION

Problems to be Solved by the Invention

With the advent of hybrid vehicles and electric vehicles, rotors of motors are required for having high rotation speeds of 14,000 rpm or more. IPM motors are mainstream motors used for vehicles. In IPM motors, magnets are embedded in rotors. From the viewpoint of efficiency of motors, installing magnets at positions close to the outermost circumference is required. For this reason, a stress concentrates on places of steel sheets having narrow widths called bridges on outer sides of magnets and rotors deform as the bridges attempt to expand. Deformation of a rotor means that it may not be possible to maintain a narrow gap between the rotor and the stator, which may lead to damage to a motor.

An object of the present invention is to provide a rotor in which damage at the time of high speed rotation is minimized.

Means for Solving the Problem

In order to achieve the aforementioned objects, the present invention proposes the following means.

A rotor according to the present invention is a magnet-embedded rotor incorporated in a traveling motor of a vehicle, and includes a laminated core having steel sheets laminated on each other and bonding layers for bonding steel sheets adjacent to each other in a laminating direction; and a magnet embedded in the laminated core. When the rotor rotates at 11,000 rpm, a maximum amount of displacement of an outer edge of the laminated core of the rotor in a radial direction is 0.1 mm or less. When the rotor rotates at 11,000 rpm, the maximum amount of displacement of the outer edge of the laminated core of the rotor in the radial direction is 0.1 mm or less. Therefore, even when the rotor rotates at a maximum rotation speed (for example, a rotation speed which exceeds 11000 rpm) when the vehicle travels, it is possible to minimize deformation of an exterior form of the rotor, and for example, it is possible to prevent the rotor from coming into contact with the stator. Thus, it is possible to minimize damage to the motor.

The maximum amount of displacement of the outer edge of the laminated core in the radial direction can be obtained using, for example, the following methods (1) and (2).

(1) An amount of displacement of a position at the outer edge of the laminated core in the radial direction before and after rotation is acquired for each position of the rotor in a circumferential direction and a maximum value among values obtained by adding an amount corresponding to elastic deformation during rotation to the amount of displacement is defined as the maximum amount of displacement.

(2) When a portion at the outer edge of the laminated core which is displaced most between before and after rotation is known in advance (for example, when this is theoretically clear or may be ascertained through simulation or an empirical rule), an amount of displacement at a position of this portion in the radial direction between before and after rotation is acquired and a value obtained by adding an amount corresponding to elastic deformation during rotation to the amount of displacement is defined as the maximum amount of displacement.

A yield stress $YP_R$ of each of the steel sheets may be 150 MPa or more and 580 MPa or less.

When the yield stress of the steel sheet is assumed to be $YP_R$ (MPa), the yield stress of the bonding layer is assumed to be $YP_B$ (MPa), and a maximum rotation speed when the vehicle travels is assumed to be ω (rpm), the following Expression (1) may be satisfied:

[Math. 1]

$$YP_B \geq A\left(\frac{\omega}{B}\right)^2\left(\omega - C\sqrt{\frac{YP_R}{D}}\right) + E \quad (1)$$

where, A=0.105, B=17000, C=17000, D=410, and E=30.

The following Expression (2) may further be satisfied:

$$0.1 \times YP_R \leq YP_B \leq 10 \times YP_R \quad (2)$$

The magnet may be disposed in a through hole which passes through the laminated core in the laminating direction and a sealing resin which seals between an outer surface of the magnet and an inner surface of the through hole may be provided in the through hole.

A method for designing a rotor according to the present invention is a method for designing a magnet-embedded rotor incorporated in a traveling motor of a vehicle, in which the rotor includes: a laminated core having steel sheets laminated on each other and a bonding layer for bonding the steel sheets adjacent to each other in a laminating direction; and a magnet embedded in the laminated core. In addition, in the designing method, when the rotor rotates at a maximum rotation speed when the vehicle travels, a yield stress of the steel sheets and a yield stress of the boding layer are set so that a maximum amount of displacement at an outer edge of the laminated core of the rotor in a radial direction is 0.1 mm or less.

According to the rotor designed using the designing method, when the rotor rotates at the maximum rotation speed when the vehicle travels, the maximum amount of displacement at the outer edge of the laminated core of the rotor in the radial direction is 0.1 mm or less. Thus, even when the rotor rotates at the maximum rotation speed when the vehicle travels, it is possible to minimize deformation of an exterior form of the rotor, and for example, it is possible to prevent the rotor from coming into contact with the stator. Therefore, it is possible to minimize damage to the motor.

Incidentally, evaluation of a bonding layer based on a bonding strength (an adhesive force between the bonding layer and the steel sheet under conditions such as tension, compression, shearing, and 90-degree peeling) has been emphasized. Against this background, there was no technical idea to restrict deformation of the steel sheet on the basis of a yield stress of the bonding layer. In order to restrict deformation of the steel sheet, there was practically no choice but to use a high-strength steel sheet. As a result, a rotor having a high cost was provided, which makes rotor production difficult. Particularly, when an electrical steel sheet is adopted as the steel sheet, it is necessary to satisfy the requirements for high strength in addition basic characteristics (low iron loss and high magnetic flux density). For this reason, not only is it difficult to design components, but also in each process such as rolling and annealing, the production conditions are restricted and production is difficult.

Therefore, in this design method, (1) the yield stress of the steel sheet and (2) the yield stress of the bonding layer are set so that the deformation of the steel sheet is restricted when the rotor rotates at the maximum rotation speed when the vehicle travels. That is to say, the yield stress of the steel sheet as well as the yield stress of the bonding layer is taken into consideration. Thus, even when the yield stress of the steel sheet is low to some extent, it is possible to restrict the deformation of the steel sheet by increasing the yield stress of the bonding layer. This is because the bonding layer can minimize the deformation of the steel sheet by partially guaranteeing a function of the steel sheet for minimizing the deformation thereof.

When a von Mises stress, particularly a force generated in a thickness direction increases and a sheet thickness of a steel sheet decreases, deformation of the steel sheet is caused. As a result of diligent studies by the inventors of the present invention, it has been found that it is effective to utilize a bonding layer having a high yield stress to minimize a decrease in sheet thickness of the steel sheet. When a bonding layer having a high stress is utilized, it is possible to minimize deformation of a steel sheet in a plastic region. Thus, a minimum amount of deformation of a steel sheet is an amount of deformation in an elastic region and it is possible to minimize an upper limit of deformation of the steel sheet which is the limit in use.

Generally, when a strength of a steel sheet increases, the number of suppliers becomes limited and the cost increases. On the other hand, a strength of an adhesive generally has a positive correlation with the cost. In addition, there are also restrictions due to a producing facility such as a high curing temperature required for the adhesive when a high strength is required.

In this design method, when the yield stress of the steel sheet as well as the yield stress of the bonding layer are taken into consideration as described above, it is possible to select an optimum combination of a steel sheet and an adhesive according to cost, regional characteristics, and marketability. Therefore, it is possible to produce a rotor which satisfies quality requirements and producing requirements. That is to say, if the present invention is utilized, the high-strength steel sheet, which is difficult to produce as described above, with a limited number of suppliers, and a high-strength steel and has a high cost, is not utilized, deformation of a steel sheet can be minimized without increasing the number of operations for strengthening a steel sheet such as special steel sheet hardening treatment or heat treatment on a fine portion of the rotor.

When the yield stress of the steel sheet is assumed to be $YP_R$ (MPa), the yield stress of the bonding layer is assumed to be $YP_B$ (MPa), and the maximum rotation speed is assumed to be co (rpm), the yield stress $YP_R$ of the steel sheet and the yield stress $YP_B$ of the bonding layer may be set to satisfy the following Expression (1):

[Math. 2]

$$YP_B \geq A\left(\frac{\omega}{B}\right)^2\left(\omega - C\sqrt{\frac{YP_R}{D}}\right) + E \quad (1)$$

where, A=0.105, B=17000, C=17000, D=410, and E=30.

The yield stress $YP_R$ of the steel sheet and the yield stress $YP_B$ of the bonding layer may be set to further satisfy the following Expression (2):

$$0.1 \times YP_R \leq YP_B \leq 10 \times YP_R \quad (2)$$

The method for producing a rotor according to the present invention utilizes this method for designing a rotor.

Effects of the Invention

According to the present invention, it is possible to provide a rotor in which damage at the time of high speed rotation is minimized.

EMBODIMENTS FOR IMPLEMENTING THE INVENTION

A rotor for a motor according to an embodiment of the present invention will be described below with reference to FIGS. 1 to 14.

<Constitution>

Figure 1:
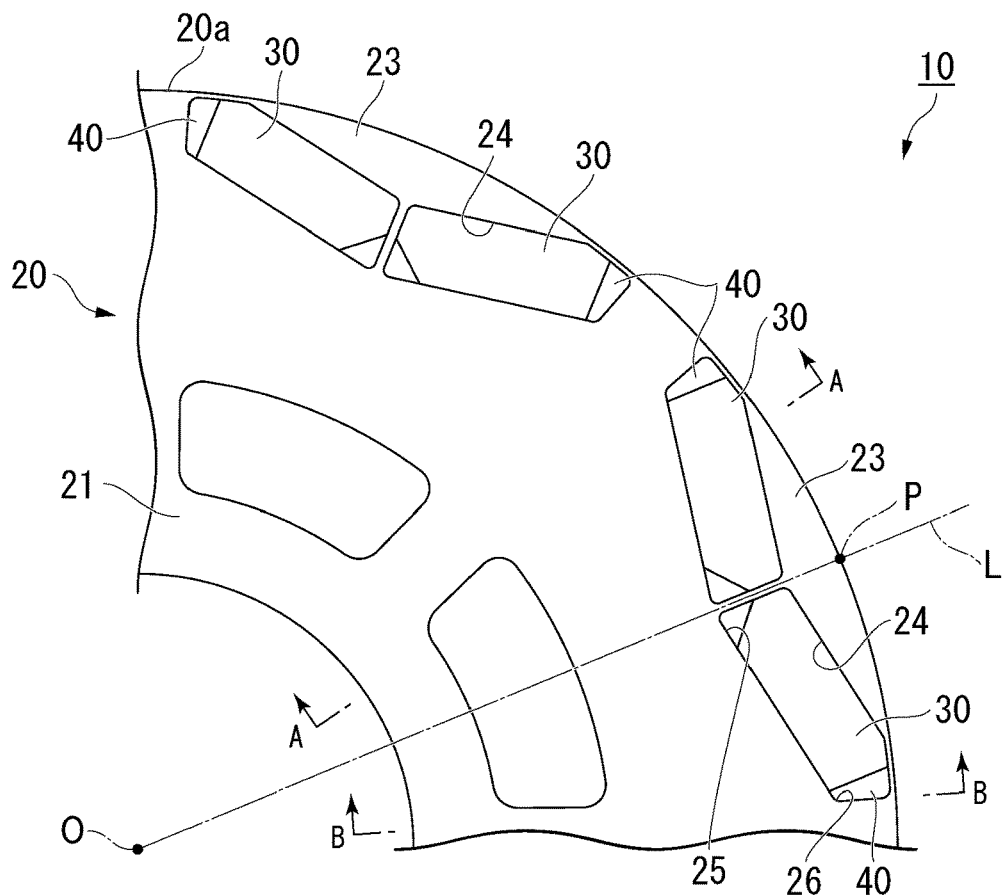
FIG. 1 is a plan view showing a part of a rotor according to an embodiment of the present invention.
Figure 2:
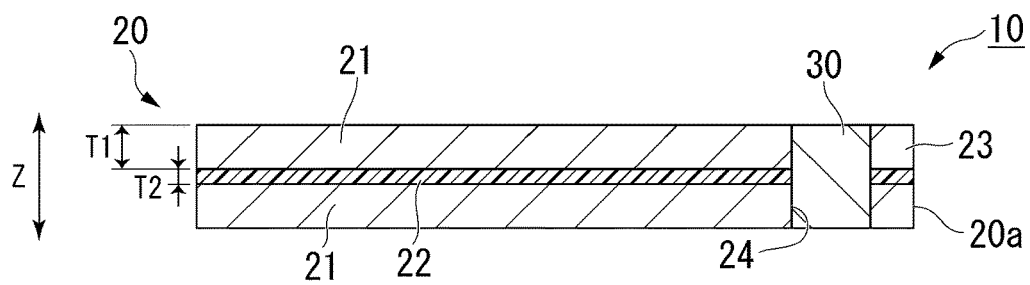
FIG. 2 is a cross-sectional view taken along arrow A-A shown in FIG. 1.
Figure 3:
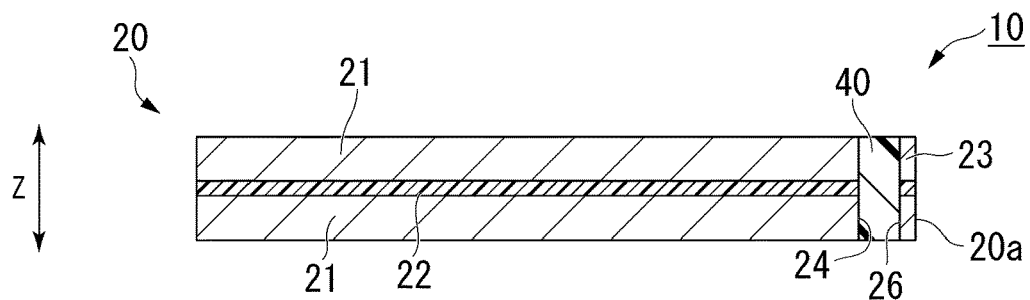
FIG. 3 is a cross-sectional view taken along arrow B-B shown in FIG. 1.

As shown in FIGS. 1 to 3, a rotor 10 is incorporated in a traveling motor of a vehicle (for example, a hybrid vehicle or an electric vehicle). The motor is an inner rotor type IPM motor (embedded magnet 30 type motor). The rotor 10 is a magnet embedded type. A maximum rotation speed of the motor is determined in accordance with the performance characteristics required for the vehicle and tends to increase when a maximum speed, acceleration, or miniaturization of the motor is important. The maximum rotation speed is, for example, 11000 rpm or faster, and more specifically 12000 rpm or faster and 20000 rpm or slower.

In the following description, an axial direction of the rotor 10 (a direction of a central axis line O of the rotor 10) is referred to as an "axial direction," a radial direction of the rotor 10 (a direction orthogonal to the central axis line O of the rotor 10) is referred to as a "radial direction," and a circumferential direction of the rotor 10 (a direction around the central axis line O of the rotor 10) is referred to as a "circumferential direction."

The rotor 10 includes a laminated core 20, magnets 30, and sealing resin pieces 40.

The laminated core 20 includes steel sheets 21 laminated to each other and a bonding layer 22 configured to bond the steel sheets 21 adjacent to each other in a laminating direction Z. The laminating direction Z coincides with the axial direction. Furthermore, in the embodiment, the steel sheets 21 adjacent to each other in the laminating direction Z are not fixed using a means different from the bonding layer 22 (for example, caulking). The steel sheets 21 are fixed only using the bonding layer 22.

The steel sheets 21 each are electrical steel sheets. The steel sheet 21 is formed, for example, by punching an electrical steel sheet. As the electrical steel sheet, a known electrical steel sheet can be utilized. A chemical composition of the electrical steel sheet is not particularly limited. In the embodiment, as the electrical steel sheet, a non-oriented electrical steel sheet is adopted. As the non-oriented electrical steel sheet, for example, a non-oriented electrical steel strip of JIS C 2552:2014 can be adopted.

The bonding layer 22 is an adhesive cured between the steel sheets 21 adjacent to each other in the laminating direction Z. As the adhesive, for example, a thermosetting adhesive and the like using polymerization bonding may be utilized. As a composition of the adhesive, (1) an acrylic resin, (2) an epoxy resin, (3) a composition containing an acrylic resin and an epoxy resin, and the like can be applied. When a strength (yield stress) of the bonding layer 22 which exceeds 80 MPa is required, as the adhesive, resins called super engineering plastics may be utilized.

The bonding layer 22 bonds a portion of the steel sheet 21 including at least a bridge 23. The bridge 23 is a portion of the steel sheet 21 located further outward in the radial direction than the magnets 30. In the illustrated example, the bonding layer 22 bonds the steel sheets 21 adjacent to each other in the laminating direction Z over the entire surface. When a thickness of the bonding layer 22 is less than 1 μm, bonding is poor, and when the thickness of the bonding layer 22 exceeds 10 μm, the efficiency of the motor is lowered. Thus, the thickness of the bonding layer 22 is preferably 1 to 10 μm.

The magnets 30 are permanent magnets. The magnets 30 are embedded in the laminated core 20. In the embodiment, a set of two magnets 30 form one magnetic pole. The plurality of sets of magnets 30 are disposed at equal intervals in the circumferential direction (every 45° in the illustrated example). The two magnets 30 forming the same magnetic pole are formed line-symmetrically in the circumferential direction with reference to a virtual line L extending in the radial direction.

Through holes 24 are formed in the laminated core 20. The through holes 24 each pass through the laminated core 20 in the laminating direction Z. The through holes 24 are provided in correspondence with the magnets 30. Each of the magnets 30 is fixed to the laminated core 20 in a state of being disposed in the corresponding through hole 24. Each of the magnets 30 is fixed to the laminated core 20 using an adhesive provided between an outer surface of the magnet 30 and an inner surface of the through hole 24. This adhesive may be of the same type as the adhesive which forms the bonding layer 22.

In the embodiment, gaps 25 and 26 in which the magnet 30 is not disposed are provided in each of the through holes 24. The gaps 25 and 26 are provided on both sides of the magnet 30, respectively, in the circumferential direction. As the gaps 25 and 26, a first gap 25 and a second gap 26 are provided. The first gap 25 is located on the virtual line L side in the circumferential direction with respect to the magnet 30. The second gap 26 is located on an opposite side of the virtual line L in the circumferential direction with respect to the magnet 30.

Each of the sealing resins 40 is disposed in the through hole 24. The sealing resin 40 seals between the outer surface of the magnet 30 and the inner surface of the through hole 24. As the sealing resin 40, for example, the same adhesive as the adhesive forming the bonding layer 22 can be adopted. As the sealing resin 40, a composition and the like containing (1) an acrylic resin, (2) an epoxy resin, (3) an acrylic resin, and an epoxy resin can be applied. An adhesive of the bonding layer 22 and an adhesive of the sealing resin 40 may be the same or different. The sealing resin 40 seals the second gap 26. Thus, the two magnets 30 forming the same magnetic pole are disposed between the two sealing resin pieces 40 in the circumferential direction. A yield stress of the sealing resin 40 is preferably 10 MPa or more and 200 MPa or less. When the yield stress of the sealing resin 40 is within this range, the stress generated in the bonding layer 22 can be reduced.

It is preferable that various dimensions of the rotor 10 be, for example, dimensions which are shown below:
(1) Diameter of rotor 10 (laminated core 20 and steel sheets 21): 50 mm or more and 200 mm or less;
(2) Thickness T1 of steel sheets 21: 0.1 mm or more and 2.0 mm or less;
(3) Thickness T2 of bonding layer 22: 2 μm or more and 4 μm or less; and (4) Laminated thickness of laminated core 20: 30 mm or more and 300 mm or less.

Also, in the embodiment, when the rotor 10 rotates at 11000 rpm for 30 seconds or more, a maximum amount of displacement at an outer edge 20a of the laminated core 20 in the radial direction is 0.1 mm or less. In the illustrated example, when the rotor 10 rotates at a rotation speed of 14000 rpm or less, the maximum amount of displacement is 0.1 mm or less.

The maximum amount of displacement at the outer edge 20a of the laminated core 20 in the radial direction can be obtained using, for example, the following methods (1) and (2).

(1) An amount of displacement (a dimension D shown in FIG. 12) of a position at the outer edge 20a of the laminated core 20 in the radial direction before or after rotation is obtained for each position of the rotor 10 in the circumferential direction (for example, every 11.25° or every 15°), and a maximum value among values obtained by adding an amount corresponding to elastic deformation during rotation to the amount of displacement (hereinafter also referred to as an "amount of exterior form displacement") is defined as the maximum amount of displacement. The amount of displacement can be measured using, for example, a laser displacement meter.

(2) When a portion at the outer edge 20a of the laminated core 20 which is most displaced before and after rotation is known in advance (for example, when it is theoretically clear or when it is grasped through simulation or an empirical rule), an amount of displacement of a position of the portion in the radial direction before and after rotation is obtained, and the amount of displacement is defined as the maximum amount of displacement.

Also, in the embodiment, when a yield stress (yield point, strength) of the steel sheets 21 is assumed to be $YP_R$ (MPa), a yield stress (yield point, strength) of the bonding layer 22 is assumed to be $YP_B$ (MPa), and a maximum rotation speed when the vehicle travels is assumed to be ω (rpm), each value of $YP_R$ and $YP_B$ satisfies the following Expressions (1) and (2):

[Math. 3]

$$YP_B \geq A\left(\frac{\omega}{B}\right)^2\left(\omega - C\sqrt{\frac{YP_R}{D}}\right) + E \quad (1)$$

where, A=0.105, B=17000, C=17000, D=410, and E=30;

$$0.1 \times YP_R \leq YP_B \leq 10 \times YP_R \quad (2).$$

When each value of $YP_R$ and $YP_B$ satisfies the above Expression (1), the bridge 23 of the steel sheet 21 is restricted to deforming within an elastic region and plastically deforms when the rotor 10 rotates at the maximum rotation speed. In other words, the bridge 23 elastically deforms and does not plastically deform. Furthermore, when the rotor 10 rotates at 11000 rpm, the maximum amount of displacement at the outer edge 20a of the laminated core 20 in the radial direction is 0.1 mm or less. When the rotor 10 rotates at 11000 rpm, the bridge 23 deforms within the elastic region. Thus, at least the outer edge 20a of the laminated core 20 deforms by about 0.020 μm in the radial direction. The maximum amount of displacement at the outer edge 20a of the laminated core 20 in the radial direction may be 30 μm or more.

When each value of $YP_R$ and $YP_B$ satisfies the above Expression (2), the yield stress $YP_B$ of the bonding layer 22 can be kept within an optimum range. That is to say, when the yield stress $YP_B$ of the bonding layer 22 is less than 0.1 times the yield stress $YP_R$ of the steel sheets 21, there is a concern concerning the yield stress $YP_B$ of the bonding layer 22 being too low and deformation occurring at a low rotation speed. When the yield stress $YP_B$ of the bonding layer 22 exceeds 10 times the yield stress $YP_R$ of the steel sheets 21, the yield stress $YP_B$ of the bonding layer 22 is too high, the effect is saturated, and economic efficiency is not established.

The yield stress $YP_R$ of the steel sheets 21 is preferably 150 MPa or more and 580 MPa or less. The yield stress $YP_B$ of the bonding layer 22 is preferably 10 MPa or more 200 and MPa or less.

Examples of a method for measuring the yield stress $YP_R$ of the steel sheets 21 include a method which will be shown later.

That is to say, a test piece having a prescribed shape (for example, a rectangular shape of 35 mm×250 mm) is cut out from the steel sheet 21 used for the laminated core 20. After that, a tensile test conforming to JIS Z 2241:2011 is carried out using this test piece. When a test piece of the steel sheet 21 is cut out from the laminated core 20 and a yield stress is measured, for example, there is a method for performing conversion of a hardness to a tensile strength on the basis of the result of hardness measurement. To be specific, the hardness of the steel sheet 21 is measured and the hardness is converted into a tensile strength using a hardness conversion table (JIS handbook) on the basis of the obtained hardness. Since a general yield ratio of a steel material is 0.73 (0.69 to 0.75), a yield stress of the steel sheet 21 can be calculated from the converted tensile strength.

Examples of a method for measuring the yield stress $YP_B$ of the bonding layer 22 include a method which will be shown later.

That is to say, a test piece of a prescribed shape (for example, a rectangular shape of 10 mm×110 mm) is cut out from the bonding layer 22 used for the laminated core 20. After that, a tensile test conforming to JIS K 7161-1 (2014) is carried out using the test piece.

When the material used for the steel sheets 21 and the bonding layer 22 are known, it is also possible to prepare a test piece independently using the materials instead of preparing a test piece from the rotor 10. As an example of the method for measuring the yield stress of the bonding layer 22 in such a case, a method in which an adhesive is cured in a strip shape, a sample piece of the bonding layer 22 is prepared, and the sample piece is subjected to a tensile test is recommended. In the case of an adhesive having a poor filling rate, a thin filter paper may be attached to a back surface to prepare a sample piece. A shape of the test piece may be a shape conforming to JIS K 7161-2:2014. When the bonding layer 22 is taken out from the laminated core 20, the bonding layer 22 may be obtained by preparing an approximately 30% by mass hydrochloric acid aqueous solution, immersing the laminated core 20 in the hydrochloric acid aqueous solution, and melting the steel sheet 21. An immersion time can be appropriately adjusted in accordance with an amount and a size of the steel sheet 21. Furthermore, particularly, when the laminated core 20 is large, the hydrochloric acid aqueous solution may be replaced with a new hydrochloric acid aqueous solution in the middle of the process to promote a melting reaction. After all of the steel sheets 21 are melted, the bonding layer 22 is taken out and cleaned. After cleaning, it is processed into a test piece conforming to HS K 7161-2:2014 and the yield stress of the bonding layer 22 is evaluated. A composition of the bonding layer 22 may be analyzed using infrared spectroscopy (FT-IR) or the like and a test piece may be prepared by the same material using the analysis result.

<Relationship Between Rotation Speed and Amount of Exterior Form Displacement of Rotor 10>

The motor is prepared to confirm a relationship between a rotation speed and an amount of exterior form displacement of the rotor 10. The rotor 10 having a diameter of 162 mm is incorporated in the motor. The rotor 10 has the laminated core 20 obtained by laminating the steel sheets 21 having a yield stress $YP_R$ of 400 MPa and a sheet thickness of 0.25 mm and the bonding layer 22 having a yield stress $YP_B$ of 12 MPa and a thickness of 2.5 μm. In each of the tests which will be shown later, the rotor 10 having the same size is assumed.

In the motor, the rotation speed of the rotor 10 is changed from 0 rpm to 17000 rpm and the amount of exterior form displacement of the rotor 10 is measured. The amount of exterior form displacement is an amount of exterior form displacement with respect to a specific measurement point P as shown in FIG. 1 in the outer edge 20a of the laminated core 20. The measurement point P is a position (a part of the bridge 23) of the outer edge 20a of the rotor 10 which intersects the virtual line L.

Figure 4:
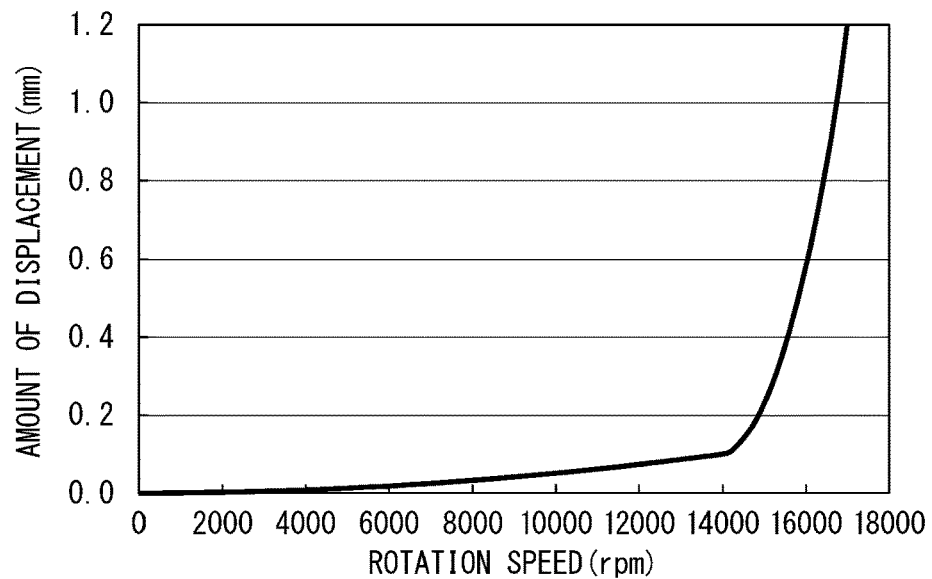
FIG. 4 is a graph showing a relationship between a rotation speed of a rotor and an amount of displacement at an outer edge of a laminated core.

The results are shown in FIG. 4. A horizontal axis of FIG. 4 indicates the rotation speed of the rotor 10 and a vertical axis of the FIG. 4 indicates the amount of exterior form displacement at the measurement point. As shown in FIG. 4, as the rotation speed of the rotor 10 increases, a centrifugal force of the rotor 10 in the radial direction increases and the amount of exterior form displacement of the rotor 10 increases. Furthermore, if the rotation speed exceeds a specific rotation speed (14000 rpm), the amount of exterior form displacement of the rotor 10 rapidly increases.

<Analysis of Stress Distribution>

Here, in order to examine the cause of a rapid increase in the amount of exterior form displacement, the inventors of the present invention quantify a stress generated in the bridge 23 at the time of high speed rotation through FEM analysis.

Figure 5:
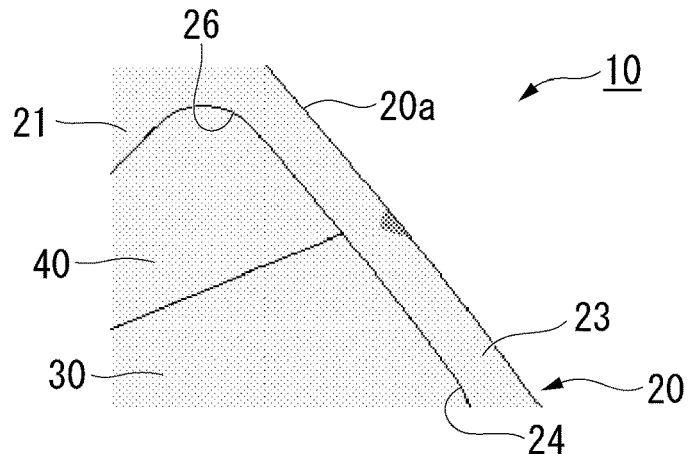
FIG. 5 is a plan view showing an analysis result of a von Mises stress distribution of a steel sheet when a rotation speed of a rotor is 14000 rpm.
Figure 6:
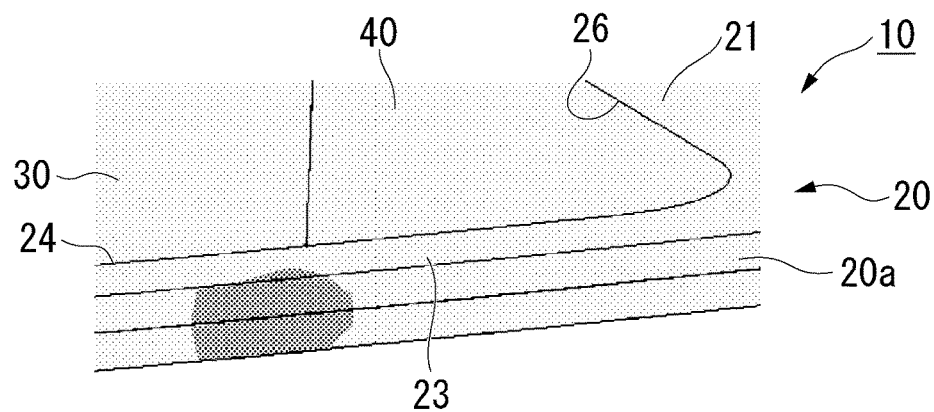
FIG. 6 is a perspective view showing the analysis result of the von Mises stress distribution of the steel sheet when the rotation speed of the rotor is 14000 rpm.
Figure 7:
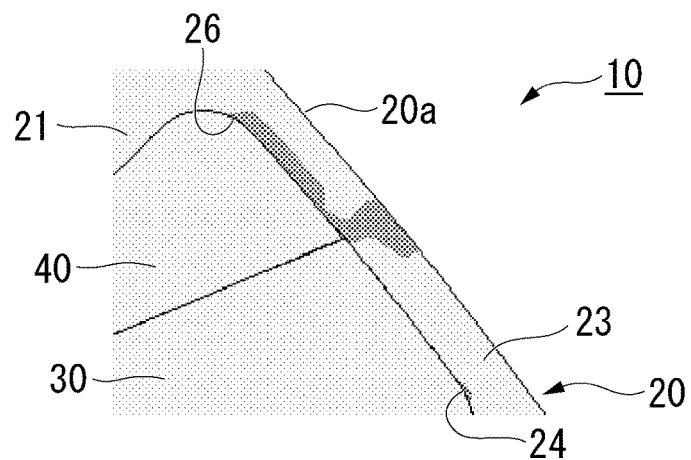
FIG. 7 is a plan view showing an analysis result of a von Mises stress distribution of a steel sheet when a rotation speed of a rotor is 15000 rpm.
Figure 8:
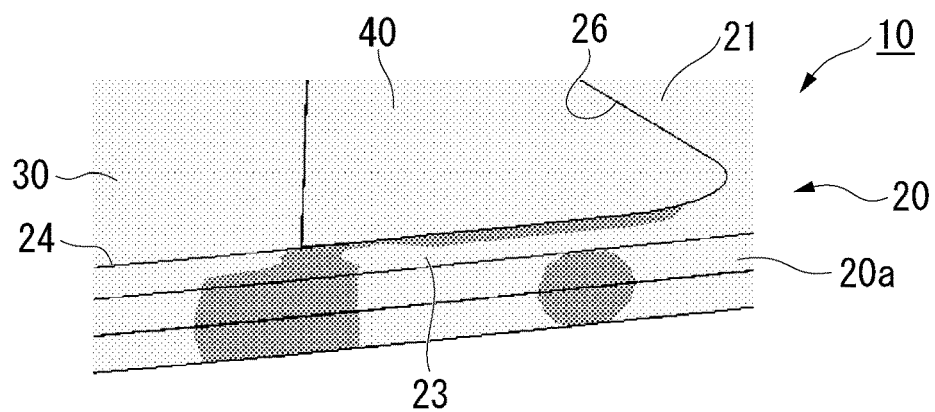
FIG. 8 is a perspective view showing the analysis result of the von Mises stress distribution of the steel sheet when the rotation speed of the rotor is 15000 rpm.
Figure 9:
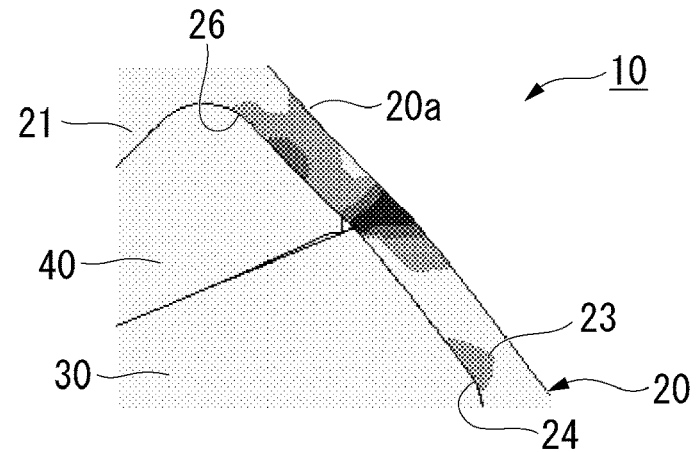
FIG. 9 is a plan view showing an analysis result of a von Mises stress distribution of a steel sheet when a rotation speed of a rotor is 16000 rpm.
Figure 10:
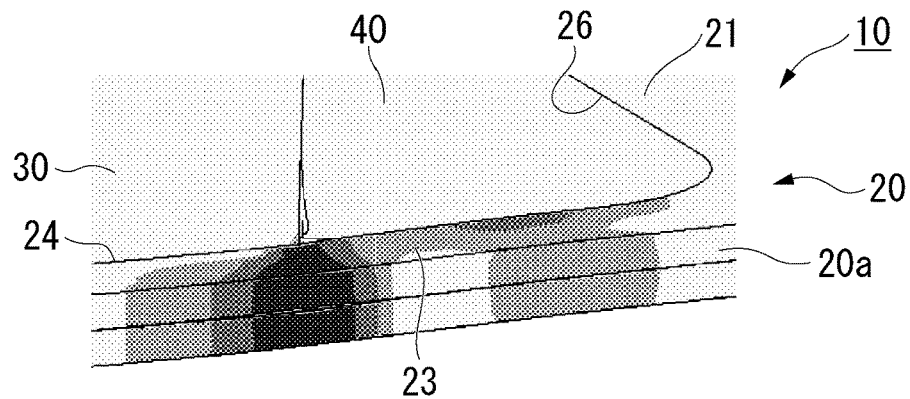
FIG. 10 is a perspective view showing the analysis result of the von Mises stress distribution of the steel sheet when the rotation speed of the rotor is 16000 rpm.

The analysis results of a von Mises stress distribution in the bridge 23 of the steel sheet 21 are shown in FIGS. 5 to 10. FIGS. 5 and 6 show a case in which a rotation speed of the rotor 10 is 14000 rpm. FIGS. 7 and 8 show a case in which the rotation speed of the rotor 10 is 15000 rpm. FIGS. 9 and 10 show a case in which the rotation speed of the rotor 10 is 16000 rpm.

In FIGS. 5 to 10, a shade of a hatch indicates a magnitude of a von Mises stress (although the magnet 30 and the sealing resin 40 are also hatched, the von Mises stress in the magnet 30 and the sealing resin 40 is smaller than a lower limit of contour display). The von Mises stress refers to an equivalent stress used for indicating a stress state generated inside an object using a single value.

For example, in FIGS. 5 and 6, two types of hatches such as a thin hatch and a dark hatch are shown on the steel sheet 21. In the drawings, the thin hatch means that the von Mises stress is less than 380 MPa. The dark hatch means that the von Mises stress is 380 MPa to 430 MPa. In the rotor 10, the yield stress $YP_R$ of the steel sheets 21 is assumed to be 356 MPa. In addition, it is conceivable that the steel sheet 21 in a region of the dark hatch surely plastically deforms.

When the analysis results of FIGS. 5 and 6 (14000 rpm), the analysis results of FIGS. 7 and 8 (15000 rpm), and the analysis results of FIGS. 9 and 10 (16000 rpm) are compared with each other, it can be seen that, as the rotation speed increases, a region having a dark hatch, that is, a region having a large von Mises stress and plastic deformation rapidly increases.

From the above analysis results, it is confirmed that the bridge 23 in the rotor 10 plastically deforms if the rotor 10 rotates at a rotation speed which exceeds 14000 rpm. It is conceivable that the results lead to a rapid increase in the amount of exterior form displacement at the time of rotating at a rotation speed which exceeds 14000 rpm as shown in FIG. 4.

<Factor Analysis of Increase in Stress>

Figure 11:
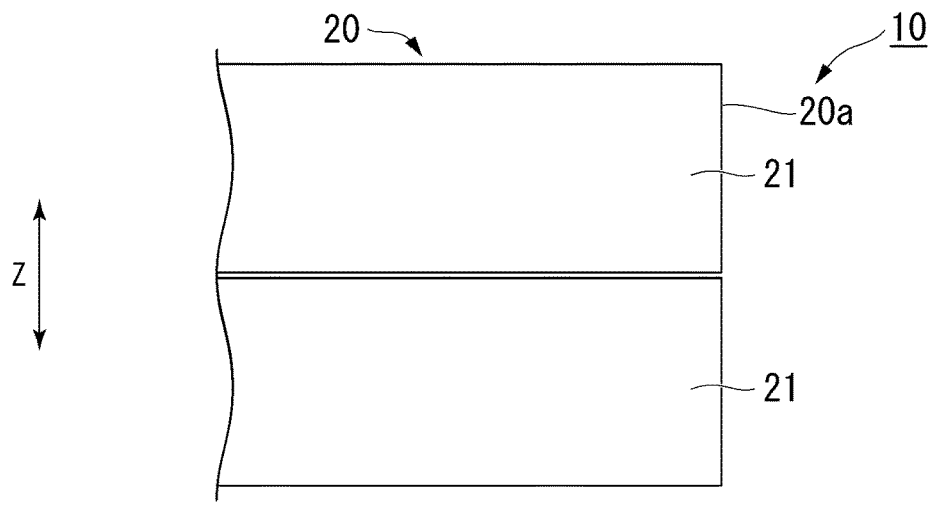
FIG. 11 is a diagram for explaining displacement at an outer edge of a laminated core and is a cross-sectional view including an outer edge of a laminated core in a state in which a rotor is not rotating.

In order to examine factors of an increase in stress as described above, a shape of the steel sheet 21 before and after rotation of the rotor 10 will be considered As shown in FIG. 11, when the rotor 10 is not rotating, a centrifugal force is not acting and the steel sheet 21 does not expand.

Figure 12:
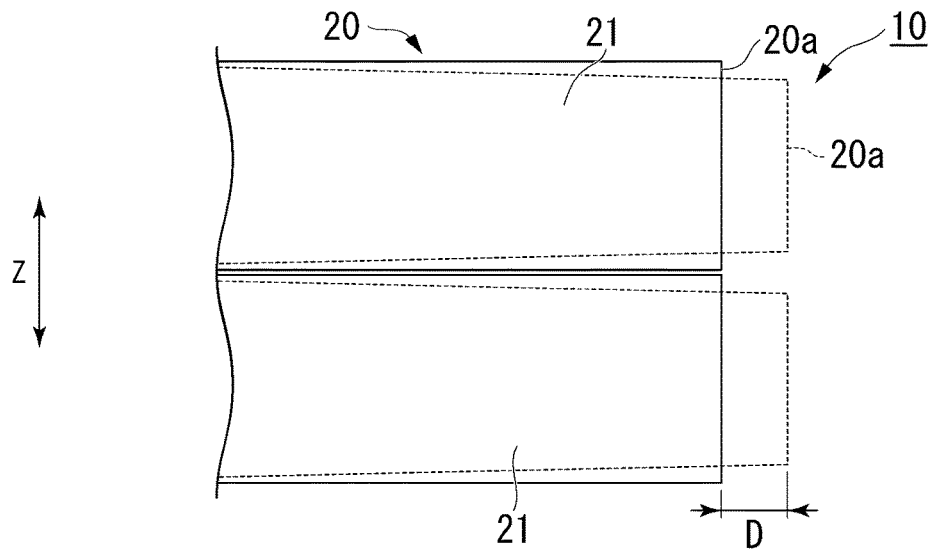
FIG. 12 is a diagram for explaining displacement at an outer edge of a laminated core and is a cross-sectional view including an outer edge of a laminated core in a state in which a rotor is rotating at high speed.

On the other hand, as shown in FIG. 12, when the rotor 10 rotates at high speed, a centrifugal force of the rotor 10 in the radial direction increases. Thus, the steel sheet 21 expands in the radial direction of the rotor 10 (a broken line in FIG. 12). When the steel sheet 21 expands in this way, a sheet thickness of an outer circumferential portion of the steel sheet 21 is reduced. As a result, it is conceivable that stress concentration is caused and thus the above-described rapid increase in von Mises stress occurs.

From the above description, it is conceivable that it is possible to reduce the amount of exterior form displacement of the rotor 10 by minimizing the expanding of the laminated steel sheet 21 in the radial direction when the rotation speed of the rotor 10 is increased.

Also, as a measure thereof, a measure of minimizing the expanding of the steel sheet 21 using the bonding layer 22 is taken into consideration by the inventors of the present invention.

A strength of an adhesive used for the bonding layer 22 usually indicates a strength (adhesive force, peeling strength) when an object to be bonded peels off. However, in the embodiment, although a tensile stress in the laminating direction Z is generated in the bonding layer 22, a shearing force is extremely small. Thus, the strength (tensile strength) of the bonding layer 22 itself, that is, the yield stress $YP_B$ which minimizes internal deformation of the bonding layer 22, is more important than the adhesive force.

When the yield stress $YP_B$ which minimizes the internal deformation of the bonding layer 22 increases, the effect of minimizing the expanding of the laminated steel sheet 21 increases. That is to say, when a tensile stress is generated in the radial direction of the rotor 10, the bonding layer 22 minimizes the deformation of the steel sheet 21. Thus, even if the rotation speed of the rotor 10 increases, it is possible to reduce the amount of exterior form displacement of the rotor 10.

Figure 13:
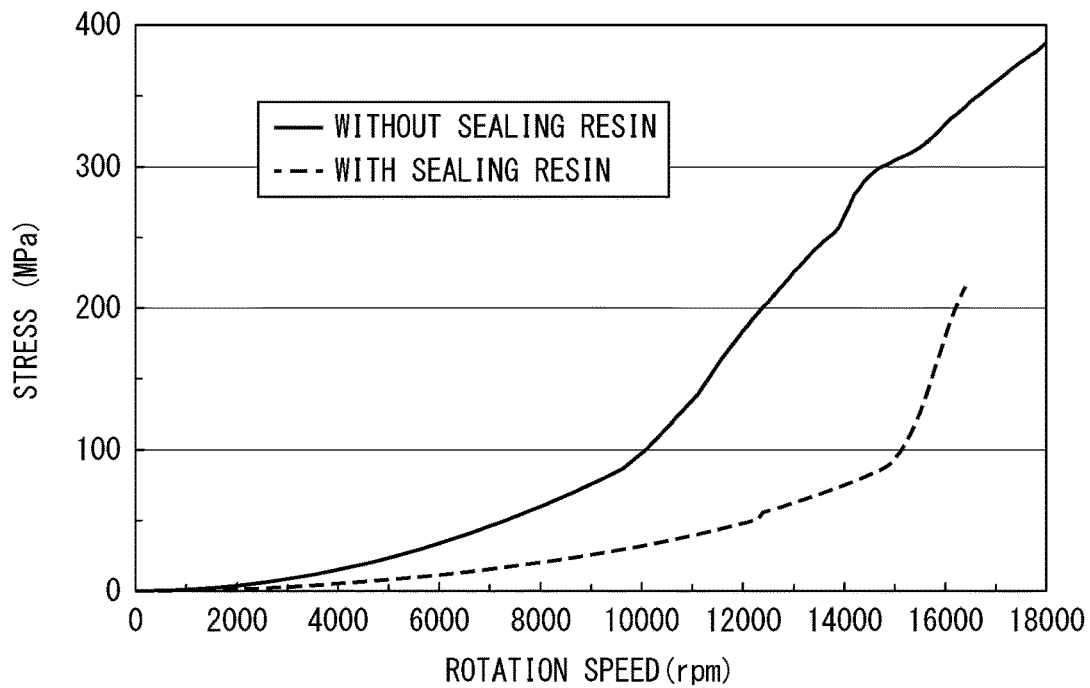
FIG. 13 is a graph showing a relationship between a rotation speed of a rotor and a magnitude of a stress generated in a bonding layer.

FIG. 13 is a graph showing a relationship between a rotation speed of the rotor 10 and a stress generated in the bonding layer 22 in the laminating direction Z. A horizontal axis of FIG. 13 indicates the rotation speed of the rotor 10. A vertical axis of FIG. 13 indicates the stress generated in the bonding layer 22. Among graph lines shown in FIG. 13, a solid line indicates a case in which the sealing resin 40 is not present and a broken line indicates a case in which the sealing resin 40 (yield stress: 12 MPa) is present.

As shown in FIG. 13, as the rotation speed of the rotor 10 increases, the stress generated in the bonding layer 22 in the laminating direction Z increases. When the laminated core 20 having the bonding layer 22 which can withstand the stress in the laminating direction Z is formed, the expanding of the rotor 10 of the laminated steel sheet 21 in the radial direction is minimized and even if rotation speed of the rotor 10 increases, the it is possible to reduce the amount of exterior form displacement of the rotor 10. It can also be seen from FIG. 13 that, when the sealing resin 40 is present, the stress generated in the bonding layer 22 is reduced in a range in which the rotation speed is 16000 rpm or less.

<Yield Stress of Bonding Layer 22>

The inventors of the present invention have found that a reference value of the yield stress of the bonding layer 22 can be calculated on the basis of the following Expression (3) when the rotation speed of the rotor 10 is assumed to be co and the yield stress of the steel sheet 21 is assumed to be $YP_R$. Expression (3) is the right-hand side of the foregoing Expression (1). The strength of the bonding layer 22 needs to satisfy the condition of the foregoing Expression (1):

[Math. 4]

$$A\left(\frac{\omega}{B}\right)^2\left(\omega - C\sqrt{\frac{YP_R}{D}}\right) + E \quad (3)$$

where, A=0.105, B=17000, C=17000, D=410, and E=30.

For example, when a rotation speed is 17000 rpm, a diameter of the rotor 10 is 162 mm, a sheet thickness of the steel sheet 21 is 0.25 mm, and a thickness of the bonding layer 22 is 0.002 mm, it is confirmed through verification using an actual machine that the maximum amount of

TABLE 1

| Steel sheet | Rotation speed (rpm) | | | |
|---|---|---|---|---|
| $YP_R$ (MPa) | 15000 | 16000 | 17000 | 18000 |
| 320 | 30 | 122 | | |
| 360 | | 30 | 135 | |
| 410 | | | 30 | 163 |
| 456 | | | | 30 |

In Table 1, a heading column (first column) indicates the yield stress $YP_R$ (MPa) of the steel sheet 21. A heading row (first row) indicates the rotation speed (rpm) of the rotor 10. A value in each cell indicates a value of the yield stress $YP_B$ (MPa) of the bonding layer 22 required for preventing the steel sheet 21 from plastically deforming when the rotor 10 rotates at a rotation speed of the heading row of the column to which the cell belongs and when the yield stress $YP_R$ of the steel sheet 21 of the heading column of the row to which the cell belongs is assumed. A blank cell means that the yield stress $YP_B$ of the bonding layer 22 under the conditions corresponding to the cell is not obtained.

The above relationship obtained from the foregoing Expression (1) is shown in the following Table 2 below. The view of Table 2 is the same as that of Table 1. Each value in the table in Table 2 is a value obtained by rounding off the value obtained from the right-hand side of the foregoing Expression (1) by a first decimal place. In Table 2, the yield stress $YP_B$ of the bonding layer 22 is obtained in more cases than in Table 1.

TABLE 2

| Steel sheet | Rotation speed (rpm) | | | | | | | | | |
|---|---|---|---|---|---|---|---|---|---|---|
| $YP_R$ (MPa) | 11000 | 12000 | 13000 | 14000 | 15000 | 16000 | 17000 | 18000 | 19000 | 20000 |
| 172 | 30 | 82 | 152 | | | | | | | |
| 204 | | 30 | 92 | 173 | | | | | | |
| 220 | | | 64 | 140 | | | | | | |
| 240 | | | 30 | 101 | 193 | | | | | |
| 260 | | | | 63 | 150 | | | | | |
| 278 | | | | 30 | 112 | | | | | |
| 300 | | | | | 67 | 166 | | | | |
| 320 | | | | | 28 | 121 | | | | |
| 340 | | | | | | 78 | 190 | | | |
| 360 | | | | | | 37 | 142 | | | |
| 380 | | | | | | | 97 | | | |
| 400 | | | | | | | 52 | 172 | | |
| 410 | | | | | | | 30 | 148 | | |
| 420 | | | | | | | | 123 | | |
| 440 | | | | | | | | 76 | | |
| 456 | | | | | | | | 38 | 171 | |
| 508 | | | | | | | | | 40 | 187 |
| 563. | | | | | | | | | | 41 | displacement of the laminated core 20 is 0.1 mm or less which is a target value when each value of $YP_R$ and $YP_B$ satisfies Expression (1).

<Verification of Expression (1)>

First, a relationship between a rotation speed of the rotor 10 and the yield stress $YP_R$ of the steel sheet 21 and the yield stress $YP_B$ of the bonding layer 22 in which plastic deformation does not occur is obtained using FEM analysis. The results are shown in Table 1 which will be shown below.

As a result of comparing the values in Tables 1 and 2 described above, it is confirmed that a difference between two values is small and the result of the FEM analysis can be approximated by Expression (1).

In this way, the rapid increase in the amount of exterior form displacement can also be realized by any of adjusting the yield stress of the bonding layer 22 and adjusting the yield stress of the steel sheet 21.

<Method for Designing Rotor 10>

When the rotor 10 is designed, the yield stress of the steel sheet 21 and the yield stress of the bonding layer 22 are set as follows. That is to say, when the rotor 10 rotates at a maximum rotation speed and a centrifugal force is transmitted from the magnet 30 to the laminated core 20, each yield stress is set so that the deformation of the steel sheet 21 is restricted (so that the stress generated in the steel sheet 21 does not reach the yield stress $YP_R$ of the steel sheet 21). To be specific, each yield stress is set so that each yield stress satisfies the foregoing Expressions (1) and (2).

Figure 14:
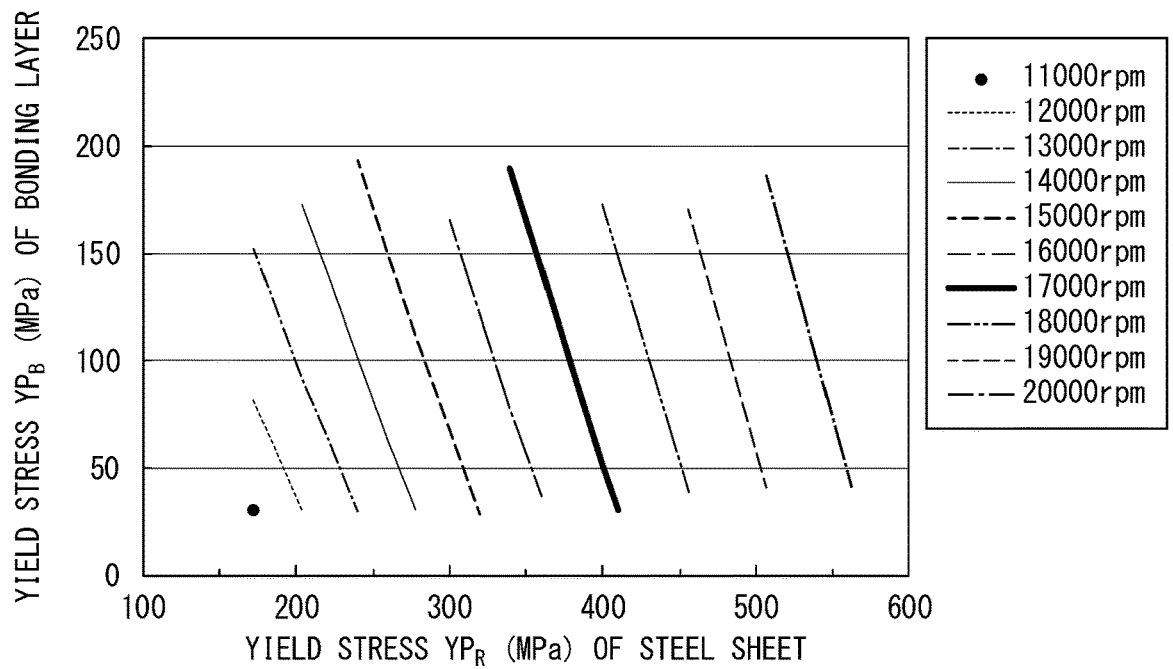
FIG. 14 is a graph showing a relationship between a strength of a steel sheet which can withstand a prescribed rotation speed and a strength of a bonding layer.

Here, the graph of FIG. 14 shows a boundary line obtained through the foregoing Expression (1). A horizontal axis of the graph of FIG. 14 indicates the yield stress $YP_R$ of the steel sheet 21. Among graph lines in FIG. 14, a graph line of a solid line indicates the value (Expression (3)) on the right-hand side of Expression (1) when the rotation speed is 16000 rpm. A graph line of a broken line indicates the value (Expression (3)) on the right-hand side of Expression (1) when the rotation speed is 17000 rpm. A graph line of a chain line indicates the value (Expression (3)) on the right-hand side of Expression (1) when the rotation speed is 18000 rpm.

In order to obtain the laminated core 20 which can withstand each rotation speed, a combination of the yield stress $YP_R$ of the steel sheet 21 and the yield stress $YP_B$ of the bonding layer 22 needs to be a combination included in a region on an upper right side of the graph line of each rotation speed shown in FIG. 14. In other words, in combinations of the strength of the bonding layer 22 and the strength of the steel sheet 21 included in an upper right region of the graph line shown in FIG. 14, all of the combinations can withstand each rotation speed. Here, a case in which a combination of the yield stress $YP_R$ of the steel sheet 21 and the yield stress $YP_B$ of the bonding layer 22 is set to a combination included in a lower left region than the graph line of each rotation speed shown in FIG. 14 is not preferable because the maximum amount of displacement of the outer edge of the laminated core of the rotor 10 in the radial direction exceeds 0.1 mm when the rotor 10 rotates. Furthermore, although the deformation strength can increase if the combination is set to a combination included in an upper right region because an unnecessary high-strength steel sheet is used and problems such as punching accuracy and production inhibition due to die wear occur. Thus, it is important to perform designing so that the combination is located on the graph line.

For example, when the rotor 10 which can withstand 17000 rpm is created, a combination of the strength of the steel sheet 21 of 360 MPa and the strength of the bonding layer 22 of 142 MPa or a combination of the strength of the steel sheet 21 of 400 MPa and the strength of the bonding layer 22 of 52 MPa is selected.

<Method for Producing Rotor 10>

The rotor 10 designed using the above design method can be produced using a known production method. For example, as the method for producing the rotor 10 using an adhesive, a method for coating each of the steel sheets 21 with an adhesive, an impregnation immersion method, a method for utilizing an adhesive processed into a tape shape, an in-mold bonding method, and the like are proposed. In the embodiment, any production method can be utilized for production and the production method is not limited.

As described above, according to the rotor 10 associated with the embodiment, when the rotor 10 rotates at 11000 rpm, the maximum amount of displacement of the outer edge 20a of the laminated core 20 in the radial direction of the rotor 10 is 0.1 mm or less. Therefore, even when the rotor 10 rotates at the maximum rotation speed (for example, a rotation speed which exceeds 11000 rpm) when the vehicle travels, it is possible to minimize the deformation of the exterior form of the rotor 10, and for example, it is possible to prevent the rotor 10 from coming into contact with the stator. Thus, it is possible to minimize the damage of the motor.

Also, according to the rotor 10 designed using the designing method associated with the embodiment, when the rotor 10 rotates at the maximum rotation speed when the vehicle travels and a centrifugal force is transmitted from the magnet 30 to the laminated core 20, the deformation of the steel sheet 21 in the radial direction is minimized by the bonding layer 22 and the deformation of the steel sheet 21 is restricted. Thus, even when the rotor 10 rotates at the maximum rotation speed when the vehicle travels, it is possible to minimize the deformation of the exterior form of the rotor 10, and for example, it is possible to prevent the rotor 10 from coming into contact with the stator. Thus, it is possible to minimize the damage of the motor.

Incidentally, evaluation of the bonding layer 22 using the bonding strength (the adhesive force with the steel sheet 21 under the conditions such as tension, compression, shearing, 90-degree peeling, and the like) has been emphasized. Against such a background, the technical idea of restricting the deformation of the steel sheet 21 on the basis of the yield stress of the bonding layer 22 does not exist. In order to restrict the deformation of the steel sheet 21, there is practically no choice but to utilize a high-strength steel sheet 21. As a result, the cost of the rotor 10 increases and it becomes difficult to produce the rotor 10. Particularly, when the electrical steel sheets 21 is adopted as the steel sheet 21, it is necessary to satisfy the requirements of high strength in addition to the basic characteristics (low iron loss, high magnetic flux density). For this reason, not only is it difficult to design the components, but also in each process such as rolling and annealing, the producing conditions are restricted and producing becomes difficult.

Therefore, in the design method, (1) the yield stress of the steel sheet 21 and (2) the yield stress of the bonding layer 22 are set so that the deformation of the steel sheet 21 in the radial direction of the rotor 10 is minimized by the bonding layer 22 and the deformation of the steel sheet 21 is restricted when the rotor 10 rotates at the maximum rotation speed when the vehicle travels and a centrifugal force is transmitted from the magnet 30 to the laminated core 20. That is to say, the yield stress of the steel sheet 21 as well as the yield stress of the bonding layer 22 is taken into consideration. Thus, even when the yield stress of the steel sheet 21 is low to some extent, it is possible to restrict the deformation of the steel sheet 21 by increasing the yield stress of the bonding layer 22.

Here, when the strength of the steel sheet 21 increases, the supply supplier is limited and the cost thereof also increases. On the other hand, the strength of the adhesive generally has a positive correlation with the cost. In addition, there are also restrictions due to a producing facility such as a higher curing temperature required when the strength of the adhesive increases.

In the design method, when the yield stress of the steel sheet 21 as well as the yield stress of the bonding layer 22 are taken into consideration as described above, it is possible to select the optimum combination of the steel sheet 21 and the adhesive according to not only the cost but also the regional characteristics and marketability. Therefore, it is possible to produce the rotor 10 which satisfies not only quality requirements but also producing requirements.

Although the relationship between the strength of the bonding layer 22 and the strength of the steel sheet 21 has been defined as described above using the specific mathematical expression, the present invention is not limited to such examples. Various changed examples or modified examples including modifications of mathematical expressions could have been clearly conceived by a person who has ordinary knowledge in the field of technology to which the present invention belongs within the scope of the technical idea described in the claims and it is naturally understood that these also belong to the technical scope of the present invention.

For example, although a pair of magnets 30 forms one magnetic pole in the rotor 10 in the above-described embodiment, the present invention is not limited thereto. One magnet 30 may form one magnetic pole or three or more magnets 30 may form one magnetic pole.

Expressions (1) and (2) may not be satisfied.

The sealing resin 40 may be omitted. The first gap 25 and the second gap 26 may be omitted.

BRIEF DESCRIPTION OF THE REFERENCE SYMBOLS

10 Rotor
20 Laminated core
20a Outer edge
21 Steel sheet
22 Bonding layer
23 Bridge
24 Through hole
30 Magnet
40 Sealing resin

The invention claimed is:

1. A magnet-embedded rotor incorporated in a traveling motor of a vehicle, comprising:
   a laminated core including steel sheets laminated to each other and a bonding layer configured to bond the steel sheets adjacent to each other in a laminating direction; and
   a magnet embedded in the laminated core,
   wherein the bonding layer bonds the steel sheets adjacent to each other in the laminating direction over an entire surface,
   wherein, when the rotor rotates at 11000 rpm, a maximum amount of displacement of an outer edge of the laminated core in a radial direction of the rotor is 0.1 mm or less,
   wherein, when the yield stress of the steel sheet is assumed to be $YP_R$ (MPa), a yield stress of the bonding layer is assumed to be $YP_B$ (MPa), and a maximum rotation speed when the vehicle travels is assumed to be $\omega$ (rpm), the following Expression (1) is satisfied:

[Math. 1]

$$YP_B \geq A\left(\frac{\omega}{B}\right)^2\left(\omega - C\sqrt{\frac{YP_R}{D}}\right) + E \tag{1}$$

where, A=0.105, B=17000, C=17000, D=410, and E=30, and wherein the following Expression (2) is further satisfied:

$$0.1 \times YP_R \leq YP_B \leq 10 \times YP_R \tag{2}$$

2. The rotor according to claim 1, wherein a thickness of the bonding layer is 1 to 10 μm.

3. The rotor according to claim 1, wherein a yield stress $YP_R$ of each of the steel sheets is 150 MPa or more and 580 MPa or less.

4. The rotor according to claim 3, wherein the magnet is disposed in a through hole which passes through the laminated core in the laminating direction, and
   a sealing resin configured to seal between an outer surface of the magnet and an inner surface of the through hole is provided in the through hole.

5. The rotor according to claim 1, wherein the magnet is disposed in a through hole which passes through the laminated core in the laminating direction, and
   a sealing resin configured to seal between an outer surface of the magnet and an inner surface of the through hole is provided in the through hole.

6. A method for designing a magnet-embedded rotor incorporated in a traveling motor of a vehicle, in which the rotor includes:
   a laminated core including steel sheets laminated to each other and a bonding layer configured to bond the steel sheets adjacent to each other in a laminating direction; and
   a magnet embedded in the laminated core, and
   in which, in the design method, when the rotor rotates at a maximum rotation speed when the vehicle travels, a yield stress of each of the steel sheets and a yield stress of the bonding layer are set so that a maximum amount of displacement of an outer edge of the laminated in a radial direction of the rotor is 0.1 mm or less,
   wherein, when the yield stress of the steel sheet is assumed to be $YP_R$ (MPa), a yield stress of the bonding layer is assumed to be $YP_B$ (MPa), and the maximum rotation speed is assumed to be $\omega$ (rpm), the yield stress $YP_R$ of the steel sheet and the yield stress $YP_B$ of the bonding layer are set so that the following Expression (1) is satisfied:

[Math. 2]

$$YP_B \geq A\left(\frac{\omega}{B}\right)^2\left(\omega - C\sqrt{\frac{YP_R}{D}}\right) + E \tag{1}$$

where, A=0.105, B=17000, C=17000, D=410, and E=30, and wherein the yield stress $YP_R$ of the steel sheet and the yield stress $YP_B$ of the bonding layer are set so that the following Expression (2) is further satisfied:

$$0.1 \times YP_R \leq YP_B \leq 10 \times YP_R \tag{2}$$

7. A method for producing a rotor using the method for designing a rotor according to claim 6.

* * * * *